H. G. CHATAIN.
PISTON PACKING.
APPLICATION FILED MAR. 15, 1916.
1,264,012.
Patented Apr. 23, 1918.
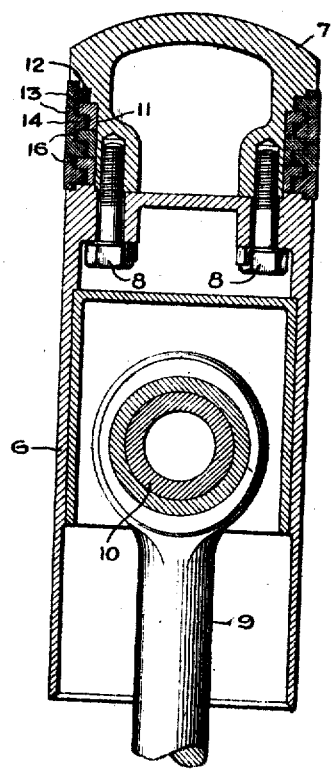
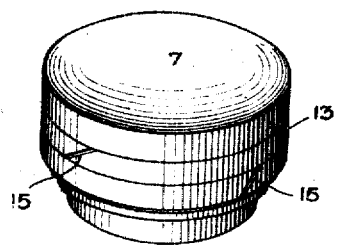
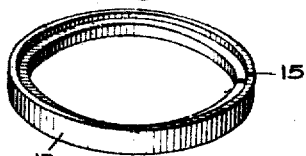
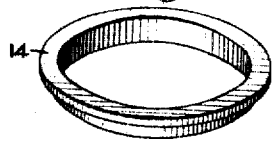
Inventor:
Henri G. Chatain,
by: [signature]
His Attorney.

UNITED STATES PATENT OFFICE.

HENRI G. CHATAIN, OF ERIE, PENNSYLVANIA, ASSIGNOR TO GENERAL ELECTRIC COMPANY, A CORPORATION OF NEW YORK.

PISTON-PACKING.

1,264,012.

Specification of Letters Patent.

Patented Apr. 23, 1918.

Application filed March 16, 1916. Serial No. 84,717.

*To all whom it may concern:*

Be it known that I, HENRI G. CHATAIN, a citizen of the United States, residing at Erie, in the county of Erie, State of Pennsylvania, have invented certain new and useful Improvements in Piston-Packings, of which the following is a specification.

The present invention relates primarily to internal combustion engines and has for one of its objects to provide an improved arrangement of packing for the piston or pistons of such engines, and particularly engines of the high compression type in which the piston or pistons control ports in the cylinder wall. The invention may however be embodied in connection with other types of engines. A further object of my invention is to provide an improved form of packing ring.

For a consideration of what I believe to be novel and my invention, attention is directed to the accompanying specification and the claims appended thereto.

In the accompanying drawing, Figure 1 is a sectional view through a piston provided with a packing embodying my invention; Fig. 2 is a detailed perspective view of a piston head with the packing partially arranged thereon, Fig. 3 is a perspective view of a piston ring, and Fig. 4 is a similar view of a follower ring.

Referring to the drawing, a piston of the trunk type is shown comprising two main parts, the body 6 and the head 7 connected by bolts 8. 9 indicates a connecting rod joined to the piston by means of a wrist pin 10. The piston head 7 is provided with an annular recess 11 forming a flange or shoulder 12, and in the recess 11 between the flange and the piston body 6 is arranged a packing comprising the packing rings 13 and the followers 14. The packing rings are preferably T-shaped, as shown in section in Fig. 1, and are split as indicated at 15. The followers are preferably L-shaped and are arranged with their long sides against the piston head. The heads of the T-shaped rings overlap the adjacent followers and contact with each other, as indicated at 16, so that there are no spaces between the rings. In assembling, the rings and followers are successively put into place on the head 7, the followers acting to properly space the rings. The head is then bolted to the body 6. By this arrangement the rings do not have to be sprung into place over the cylinder head, and hence can be made much heavier and sufficiently wide to completely overlap the followers. This avoids the usual spaces ordinarily found between successive rings and in which lubricant is very apt to be caked or carbonized. It is necessary to make the cylinder head of smaller diameter than the bore of the cylinder to prevent sticking of the pistons under expansion due to heat, and hence the space between successive rings is in the form of an annular groove. The oil which accumulates in these grooves will, when the engine is shut down, bake on, and when the engine is again started will cause additional friction and prevent the carrying off of heat from the piston to the cylinder wall. By my improved arrangement I entirely avoid these difficulties, and at the same time I provide substantial surfaces for conducting heat from the piston head through the followers and packing rings to the cylinder wall. The followers, which are tightly fitted on the piston head, have a large surface in contact therewith, and also large surfaces in contact with the packing rings, which in turn, owing to their width, have a large area of contact with the cylinder wall. This provides a maximum amount of surface for conducting heat from the piston head to the cylinder wall.

My improved packing arrangement is of particular utility in connection with cylinders having ports over which the rings travel. If the rings are weak and narrow they are apt to be caught in the ports and broken, particularly if they should work to a position where the split in the ring passes over a port, and ordinarily such rings are required to be pinned against circumferential movement. With my improved arrangement the rings are sufficiently broad and stiff that they will safely pass over ports and hence do not need to be pinned. In other words, they can be assembled in a floating condition which is very desirable as the rings can then more freely adjust themselves to the cylinder walls, also since they can travel around, the wear will be more uniform. Furthermore, since the rings are heavier they may be placed nearer the cylinder head, and since they are symmetrical in shape they are not liable to twist or curl.

With engines, particularly those operating with high pressure, it is important that the air or gas should not leak freely between the packing ring and the piston, as this will cause undue pressure of the ring against the cylinder wall. In my improved arrangement, owing to the circuitous path through which the gas or air must travel in passing behind the packing ring, there can be substantially no leakage between the rings and the piston head.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:—

1. The combination with a piston having a circumferential groove in its head, of a packing therein comprising follower rings having broad surfaces which engage the bottom of the groove and projecting parts between which are annular spaces, and split packing rings which are T-shaped in cross section, the shanks of said packing rings fitting in the annular spaces between said projecting parts and the heads of such rings overlapping said projecting parts and being substantially in engagement with each other.

2. The combination with a piston having a circumferential groove in its head, of a packing therein comprising follower rings which are L-shaped in cross section, one side of said follower rings engaging the bottom of said groove so as to have a broad surface in engagement therewith for conveying heat therefrom, and split packing rings which are T-shaped in cross-section, the shanks of said packing rings being located between said followers and spaced apart thereby, and the heads of such packing rings overlapping the follower rings and being in engagement with each other so as to present a smooth packing surface.

In witness whereof I have hereunto set my hand this fourteenth day of March, 1916.

HENRI G. CHATAIN.